United States Patent [19]

Takenaka

[11] Patent Number: 5,223,700
[45] Date of Patent: Jun. 29, 1993

[54] BAR CODE READER HAVING A POLYGON MIRROR PROVIDING DIFFERENT SCAN LINE LENGTHS

[75] Inventor: Shinya Takenaka, Osaka, Japan

[73] Assignee: Sumitomo Electric Industries, Inc., Osaka, Japan

[21] Appl. No.: 839,040

[22] Filed: Feb. 18, 1992

Related U.S. Application Data

[63] Continuation of Ser. No. 547,842, Jul. 3, 1990, abandoned.

[30] Foreign Application Priority Data

Jul. 7, 1989 [JP] Japan ..................... 1-76915

[51] Int. Cl.⁵ .................... G06K 7/10; G02B 26/10
[52] U.S. Cl. ..................... 235/467; 359/217
[58] Field of Search ............. 235/454, 462, 467; 359/197, 212, 216, 217, 218, 219, 233, 236

[56] References Cited

U.S. PATENT DOCUMENTS

| | | | |
|---|---|---|---|
| 4,018,504 | 3/1977 | Wu et al. ................. | 250/236 |
| 4,043,632 | 8/1977 | Jeffery et al. ............ | 359/217 |
| 4,518,218 | 5/1985 | Diepeveen ............... | 359/217 |
| 4,938,551 | 7/1990 | Matsumoto .............. | 235/467 X |
| 4,967,074 | 10/1990 | von Stein .............. | 235/467 |

FOREIGN PATENT DOCUMENTS

| | | | |
|---|---|---|---|
| 1081009 | 7/1980 | Canada ..................... | 359/216 |
| 3602008 | 7/1987 | Fed. Rep. of Germany ...... | 235/463 |
| 52-55166 | 5/1977 | Japan ...................... | 359/216 |
| 63-1259 | 1/1988 | Japan . | |
| 63-257882 | 10/1988 | Japan . | |
| 1-46725 | 2/1989 | Japan ...................... | 359/218 |
| 1-321582 | 12/1989 | Japan . | |
| 437111 | 1/1975 | U.S.S.R. ................... | 359/216 |

*Primary Examiner*—John Shepperd
*Assistant Examiner*—Edward H. Sikorski
*Attorney, Agent, or Firm*—Kenyon & Kenyon

[57] ABSTRACT

A bar code reader reads a bar code by scanning a laser beam on a screen on which the bar code is displayed. The bar code reader has a beam scanning device for scanning the laser beam irradiated from a laser oscillator. The beam scanning device has a polygon mirror which is rotated and driven around an axis. The polygon mirror forms at least two kinds of flat reflecting surfaces for respectively scanning the laser beam along with the rotation of polygon mirror. Scanning angles by the reflecting surfaces are twice as large as opposite angles to which the reflecting surfaces correspond respectively. The laser beam is scanned at two or more kinds of scanning angles, that is, scanning angles and which are respectively adapted to the long and short bar codes. Therefore, the bar code can be accurately read irrespective of a length thereof.

4 Claims, 3 Drawing Sheets

BAR CODE READER HAVING A POLYGON MIRROR PROVIDING DIFFERENT SCAN LINE LENGTHS

This application is a continuation of application Ser. No. 07/547,842, filed Jul. 3, 1990, now abandoned.

BACKGROUND OF THE INVENTION

The present invention relates to a bar code reader, and more particularly to a bar code reader for reading a bar code displayed on a surface of an object which is situated at a distance using a laser beam.

Recently, there is widely generalized a system in which information such as a manufacturer's name, a trade name, a price, the date of production or the like is printed as a bar code on surfaces of goods, the bar code thus printed is read by means of an optical bar code reader and thereby sale, stock or the like is managed.

There has been proposed a laser beam scanning type bar code reader. The laser beam scanning type bar code reader comprises a laser oscillator for outputting a laser beam, beam scanning means for scanning the laser beam at a constant scanning angle, detection means including a photocell for receiving light reflected by a screen of the bar code, converting the received light into an electric signal according to a quantity of the received light and outputting the electric signal, and identification means for identifying the bar code based on the electric signal.

According to the laser beam scanning type bar code reader, the laser beam is automatically scanned. Therefore, the laser beam scanning type bar code reader has an advantage that it is not required to move a scanning head with being come in contact with the object differently from a pen type bar code reader. Namely, in a fixed type bar code reader having each means incorporated in a case which can be fixed, it is sufficient to hold the object by hand. Moreover, in a hand held type bar code reader having the device incorporated in a box which can be held by hand, it is sufficient to aim at the bar code.

The length of the bar code to be read in a scanning direction depends on a standard, for example, within about 2 to 10-odd cm. To generalize the bar code reader, it is required to correspond to the bar code having the various lengths. Accordingly, a scanning angle of the laser beam scanned by the laser beam scanning means is set large such that the bar code having a length of about 10-odd cm can be read with a normal distance (for example, about 10 cm) kept between the bar code reader and the bar code screen.

On the other hand, in the bar code reader of which scanning angle is set large in order to be adapted to the long bar code, the laser beam is scanned on a plurality of bar codes at a time if the plurality of bar codes are displayed in the scanning direction. Accordingly, both the bar code to be read and the bar code not to be read are captured in a locus on the screen of the scanned laser beam, that is, a scanning area. Therefore, there is a problem that the bar code to be read cannot be identified but the bar code not to be read is inputted.

It is also considered that the distance between the bar code reader and the bar code screen is adjusted according to the length of the bar code to be read by means of the bar code reader of which scanning angle is set so as to be adapted to the bar code having an average length and thereby only the bar code to be read is captured in the scanning area. In this case, however, it is difficult for an operator to optimize the distance at every reading operation. If the distance is long, a read error is occurred because the intensity of the light reflected by the bar code screen is lowered or the aim is moved easily.

SUMMARY OF THE INVENTION

It is an object of the present invention to provide a bar code reader which can precisely read a bar code irrespective of a length in the scanning direction of the bar code.

The above object is achieved by the bar code reader to be discussed below.

The bar code reader for reading the bar code using light reflected by the screen on which the bar code is displayed comprises a scanning means for reflecting a laser beam irradiated from a laser oscillator toward said screen and scanning the laser beam thus reflected on said screen, said scanning means having a polygon mirror which is rotated and driven around an axis, said polygon mirror forming at least two kinds of flat reflecting surfaces for respectively scanning the laser beam along with the rotation of said polygon mirror in a rotary direction thereof, said reflecting surfaces respectively corresponding to opposite angles various with the kinds of reflecting surfaces, said opposite angle subtending a side of an isosceles triangle, said triangle contains the side in which a plane perpendicular to the axis and the reflecting surface intersect and the summit at which the axis and the plane intersect.

According to the bar code reader having the above construction, the opposite angle corresponding to each reflecting surface of the polygon mirror varies with the kind of the reflecting surface. On the other hand, an angle at which the laser beam is scanned by each reflecting surface is twice as large as the opposite angle corresponding to the reflecting surface and depends on the opposite angle. Accordingly, the laser beam is scanned at large and small scanning angles along with the rotation of the polygon mirror.

In case that the long bar code displayed in the scanning direction is to be read, the laser beam cannot scan the entire bar code even at the small scanning angle. Namely, since the bar code protrudes from the scanning area, it cannot be read.

However, since the laser beam is scanned at the large scanning angle along with the rotation of the polygon mirror, the bar code can be captured and read in the scanning area.

On the other hand, in case that one of a plurality short bar codes displayed in the scanning direction is to be read, the laser beam scans the plurality of bar codes at the large scanning angle. Namely, since the plurality of bar codes enter the scanning area, the bar code to be read cannot be read. However, since the laser beam is scanned at the small scanning angle along with the rotation of the polygon mirror, only the bar code to be read can be captured and read in the scanning area.

DESCRIPTION OF THE PREFERRED EMBODIMENT

An embodiment will be described in detail with reference to drawings.

Figure 4:
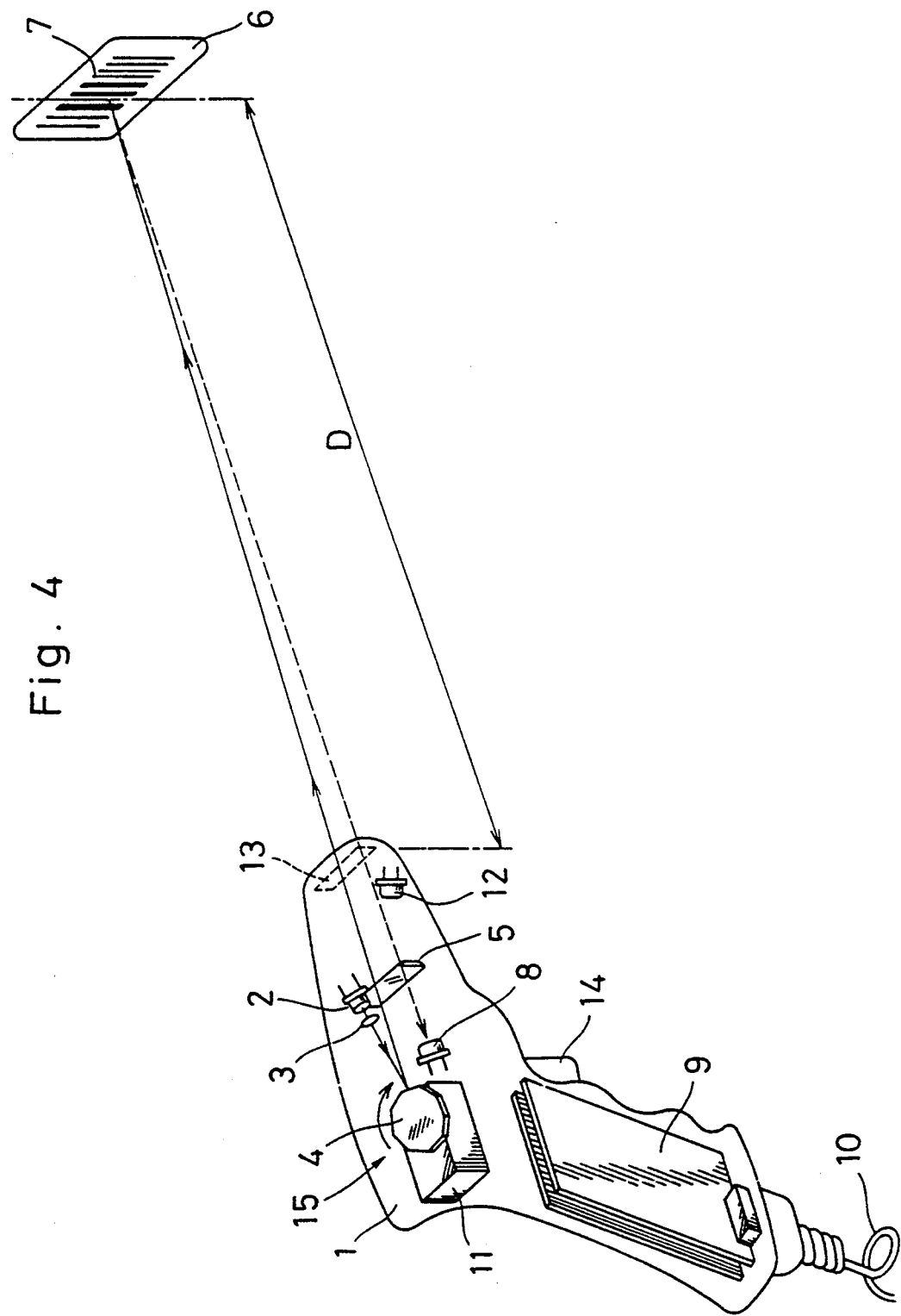
FIG. 4 is a schematically perspective view of a bar code reader.

A bar code reader shown in FIG. 4 is of a laser beam scanning and hand held type. The bar code reader comprises a pistol-shaped casing 1. The casing 1 includes a laser oscillator 2, an aplanatic lens 3, beam scanning means 15, a cylindrical lens 5, an optical sensor 8 and a processing portion 9.

The laser oscillator 2 is a device for outputting a semiconductor laser or helium neon laser. The aplanatic lens 3 is a lens which converges light outputted from the laser oscillator 2.

The beam scanning means 15 has a polygon mirror 4 which reflects the converged laser beam and scans a screen 6 on which a bar code is displayed using the reflected laser beam and a motor 11 which rotates the polygon mirror 4 around an axis 41.

The cylindrical lens 5 condenses the light reflected by the screen 6. The optical sensor 8 consists of a photo diode or the like for receiving the reflected light condensed by the cylindrical lens 5. The processing device 9 includes a microcomputer which performs waveform shaping and binary indication of signals outputted from the optical sensor 8 to obtain the signals corresponding to the shape of a bar code 7 and identifies the contents of the bar code 7 based on the signals thus obtained.

A cord 10 which comes out of the casing 1 is a signal cord for supplying the signals outputted from the processing device 9 to an outer portion. A lever 14 is a read switch of the bar code reader.

Figure 1:
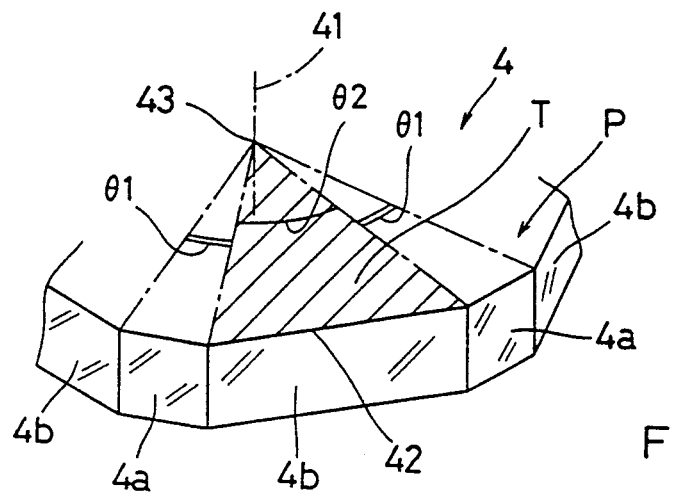
FIG. 1 is a perspective view in portions of a polygon mirror.
Figure 2:
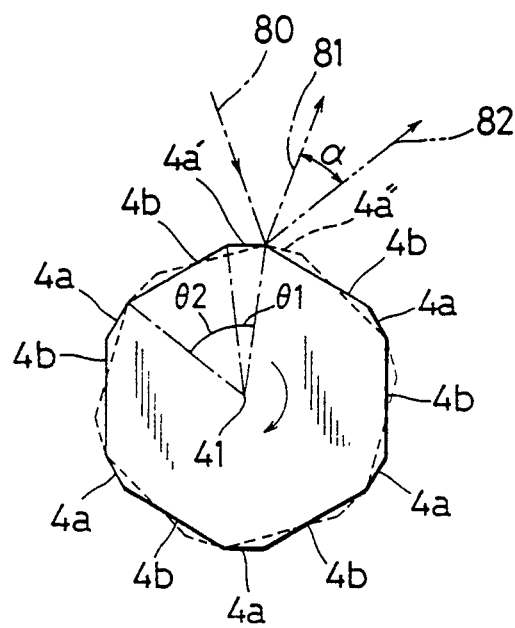
FIGS. 2 and 3 are plan views of the polygon mirror.
Figure 3:
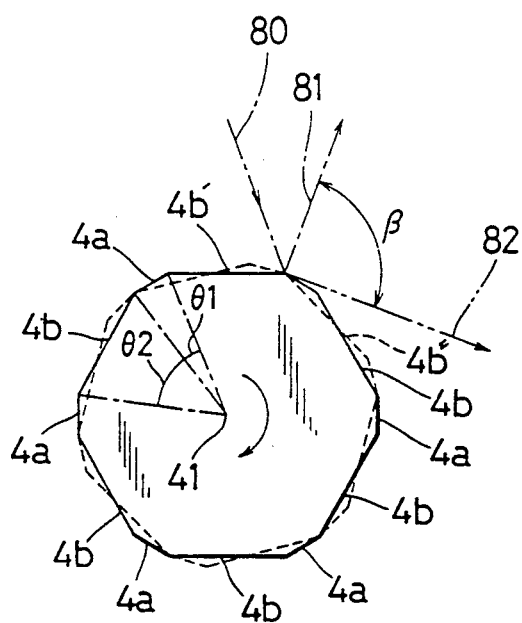

With reference to FIGS. 1 to 3, the polygon mirror 4 has two kinds of flat reflecting surfaces 4a and 4b for scanning the laser beam on polygonal sides around the axis 41. The reflecting surfaces 4a and 4b are alternately arranged in a rotary direction of the polygon mirror 4. The reflecting surface 4b corresponded to an opposite angle θ2. The opposite angle θ2 is subtended by a side 42 of a isosceles triangle T. The triangle T contains the side 42 and a summit 43. The side is formed by a line in which a plane P perpendicular to the axis 41 and the reflecting surface 4b intersect. The summit 43 is formed by a point at which the axis 41 and the plane P intersect. Similarly the reflecting surface 4a corresponded to an opposite angle θ1. The opposite angles θ1 and θ2 are different from each other so that a scanning angle α by the reflecting surface 4a and a scanning angle β by the reflecting surface 4b are different from each other.

With reference to FIG. 2, the laser beam in a direction 80 is reflected in a direction 81 by the reflecting surface 4a (especially shown by 4a') of the polygon mirror 4 shown in solid lines. If the polygon mirror 4 is rotated clockwise by 1 (shown in broken lines), the laser beam is reflected in a direction 82 by the reflecting surface 4a (especially shown by 4a") which is rotated and moved. An angle formed by the directions 81 and 82 is an angle at which the laser beam is shaken by the reflecting surface 4a, that is, a scanning angle α. With reference to FIG. 3, the angle formed by the directions 81 and 82 is a scanning angle β at which the laser beam is shaken by the reflecting surface 4b.

The scanning angles α and β of the laser beam by the reflecting surfaces 4a and 4b are twice as large as the opposite angles θ1 and θ2 corresponding to the reflecting surfaces 4a and 4b, respectively. Accordingly, if the opposite angle θ1 corresponding to the reflecting surface 4a is 15°, the scanning angle α of the laser beam by the reflecting surface 4a is 30°. Similarly, if the opposite angle θ2 corresponding to the reflecting surface 4b is 45°, the scanning angle β of the laser beam by the reflecting surface 4b is 90°. A distance D between the screen 6 and the bar code reader in which the bar code 7 can be aimed at most easily is about 10 cm. In the distance D, a locus of the laser beam scanned by the reflecting surface 4a on the screen 6 has a length of 5.4 cm, while the locus of the laser beam scanned by the reflecting surface 4b has a length of 20 cm.

Generally, among the bar codes in a scanning direction, the shortest one has a length of about 2 cm and the longest one has a length of about 10-odd cm. Therefore, the shortest bar code can be corresponded to by the reflecting surface 4a and the longest bar code by the reflecting surface 4b, respectively.

A series of operation from the scanning of the laser beam by the polygon mirror 4 to the identification of the bar code 7 by the processing device 9 is repeated until a correct answer is obtained.

According to the present embodiment, if the lever 14 is operated, the motor 11 is driven and thereby the polygon mirror 4 is rotated to irradiate the laser beam from the laser oscillator 2. The irradiated laser beam alternately beats against the reflecting surfaces 4a and 4b of the rotary polygon mirror 4 and thereby is reflected by them. In addition, the light thus reflected is alternately scanned at different scanning angles α and β corresponding to the rotary movement of the reflecting surfaces 4a and 4b. The scanned beams is irradiated on the screen 6 through an opening 13.

Figure 5:
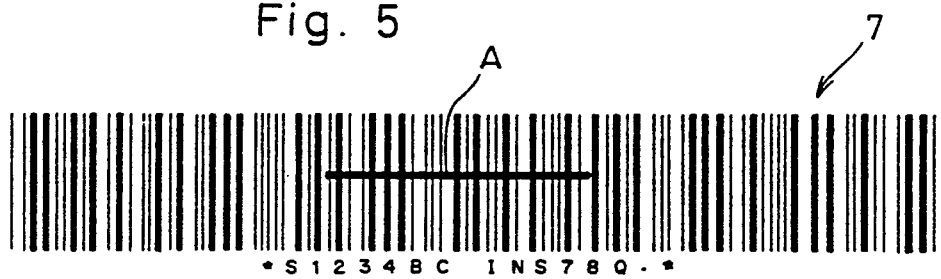
FIGS. 5 to 8 are views of a screen on which a laser beam is scanned, respectively.
Figure 6:

As shown in FIG. 5, when the long bar code is read, the locus of the laser beam to be scanned on the screen 6, that is, a scanning area A of the laser beam cannot cover the entire bar code 7 even if the laser beam is scanned at the small scanning angle α by the reflecting surface 4a. Namely, since the bar code 7 protrudes from the scanning area A of the laser beam, the bar code reader cannot read the bar code 7. However, since the laser beam is subsequently scanned at the large scanning angle β by the reflecting surface 4b, the bar code reader can capture and read the bar code 7 in the scanning area A as shown in FIG. 6.

Figure 7:
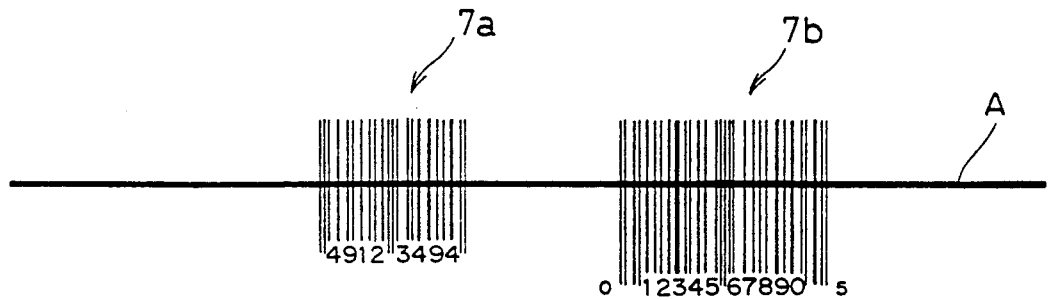
Figure 8:
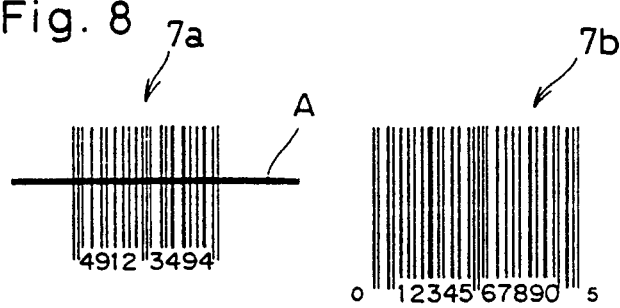

On the other hand, in case that only a bar code 7a of two short bar code 7a, 7b in the scanning direction is to be read, the bar codes 7a and 7b enter the scanning area A even if the laser beam is scanned at the large scanning angle β by the reflecting surface 4b as shown in FIG. 7. Therefore, the bar code reader cannot read the bar code 7a to be read. However, since the laser beam is subsequently scanned at the small scanning angle α by the reflecting surface 4a, the bar code reader can capture and read only the bar code 7a to be read in the scanning area A as shown in FIG. 8.

Since the polygon mirror 4 has a plurality of reflecting surfaces 4a and 4b, the scanning at the same scanning angles α and β are performed plural times as the polygon mirror 4 is rotated one time. Therefore, the bar code reader can surely read the bar code.

Furthermore, in the bar code reader in which the reflecting surfaces 4a and 4b are consecutively arranged in the rotary direction of the polygon mirror 4, the scanning angle of the laser beam is changed at every half rotation of the polygon mirror 4. Therefore, it may be required that the polygon mirror 4 makes a half rotation or more until the bar code can be read and thereby the average read time may become longer.

However, in the bar code reader of the present embodiment, different kinds of reflecting surfaces 4a and 4b are alternately arranged in the rotary direction of the polygon mirror 4. Therefore, the average time required for reading the bar code can be shortened.

There is a locus of the laser beam scanned by the reflecting surface 4a in the center of the locus of the laser beam scanned by the reflecting surface 4b on the screen. The latter locus seems brighter than the former one. Therefore, there is also an advantage that the bar code 7 can be aimed at easily. The bar code reader according to the present invention is not limited to the above embodiment. By way of example, three kinds of reflecting surfaces or more may be provided on the polygon mirror 4 such that the laser beam can be scanned at three kinds of different scanning angles or more by the polygon mirror 4.

The above embodiment can be also applied to a fixed type bar code reader.

As described above, according to the bar code reader of the present invention, the laser beam is scanned at the different angles by two kinds of reflecting surfaces of the polygon mirror. Therefore, the laser beam can be scanned at the large scanning angle and thereby the long bar code can be captured and read in the scanning area. In addition, the laser beam can be scanned at the small scanning angle and thereby only a bar code to be read of a plurality of short bar codes in the scanning direction can be captured and read in the scanning area. Accordingly, there can be obtained a peculiar effect that the bar code can be accurately read irrespective of the length thereof.

What is claimed is:

1. A bar code reader for reading a bar code displayed on a surface by using light scanned across and reflected by the surface, the bar code reader comprising:
   a scanner for generating and directing a light beam through a scanning area that traverses the surface including the displayed bar code;
   said scanner including a polygon mirror having a perimeter and being arranged for rotation about an axis of rotation;
   said polygon mirror forming at least two reflecting surfaces along the perimeter for reflecting and scanning the light beam generated by said scanner across the surface including the bar code as the polygon mirror is rotated about the axis of rotation;
   a first one of the at least two reflecting surfaces being configured relative to said polygon mirror to extend along a first distance of the perimeter so that a line defined by the intersection between a plane perpendicular to the axis of rotation and the first one of the at least two reflecting surfaces, is subtended by an angle $\theta_1$ having an apex at the intersection of the plane and the axis of rotation, the first reflecting surface being parallel to the axis of rotation;
   a second one of the at least two reflecting surfaces being configured relative to said polygon mirror to extend along a second distance of the perimeter so that a line defined by the intersection between the plane perpendicular to the axis of rotation and the second one of the at least two reflecting surfaces, is subtended by an angle $\theta_2$ having an apex at the intersection of the plane and the axis of rotation, the second reflecting surface being parallel to the axis of rotation;
   the angle $\theta_2$ being greater than the angle $\theta_1$.

2. The bar code reader of claim 1, wherein said polygon mirror forms a plurality of reflecting surfaces spaced about the perimeter of the polygon mirror and wherein each one of a first set of the plurality of reflecting surfaces includes a line defined by the intersection between the plane perpendicular to the axis of rotation and the respective one of the first set of reflecting surfaces, that is subtended by the angle $\theta_1$ and each one of a second set of the plurality of reflecting surfaces includes a line defined by the intersection of the plane perpendicular to the axis of rotation and the respective one of the second set of reflecting surfaces, that is subtended by the angle $\theta_2$.

3. The bar code reader of claim 2, wherein the first and second sets of the plurality of reflecting surfaces are arranged sequentially, in an alternating pattern, around the perimeter of the polygon mirror.

4. A bar code reader for reading a bar code displayed on a surface by using light scanned across and reflected by the surface, the bar code reader comprising:
   a scanner for generating and directing a light beam through a scanning area that traverses the surface including the displayed bar code;
   said scanner including a polygon mirror having a perimeter and being arranged for rotation about an axis of rotation;
   said polygon mirror forming at least two reflecting surfaces along the perimeter for reflecting and scanning the light beam generated by said scanner across the surface including the bar code as the polygon mirror is rotated about the axis of rotation;
   a first one of the at least two reflecting surfaces being configured relative to said polygon mirror to extend along a first distance of the perimeter so that a line defined by the intersection between a plane perpendicular to the axis of rotation and the first one of the at least two reflecting surfaces, is subtended by an angle $\theta_1$ having an apex at the intersection of the plane and the axis of rotation, the first reflecting surface being parallel to the axis of rotation;
   a second one of the at least two reflecting surfaces being configured relative to said polygon mirror to extend along a second distance of the perimeter so that a line defined by the intersection between the plane perpendicular to the axis of rotation and the second one of the at least two reflecting surfaces, is subtended by an angle $\theta_2$ having an apex at the intersection of the plane and the axis of rotation, the second reflecting surface being parallel to the axis of rotation;
   the second distance being greater than the first distance.

* * * * *